J. B. BIRGH.
ROLLER BEARING.
APPLICATION FILED DEC. 13, 1920.

1,410,988. Patented Mar. 28, 1922.

Witnesses
Geo. L. Lawrence
Arthur C. Wright

Inventor
John B. Birgh
By Chas. C. Tillman
Attorney

UNITED STATES PATENT OFFICE.

JOHN B. BIRGH, OF CHICAGO, ILLINOIS.

ROLLER BEARING.

1,410,988.    Specification of Letters Patent.    Patented Mar. 28, 1922.

Application filed December 13, 1920. Serial No. 430,173.

*To all whom it may concern:*

Be it known that I, JOHN B. BIRGH, a subject of the King of Sweden, residing at Chicago, in the county of Cook and State of Illinois, have invented certain new and useful Improvements in Roller Bearings, of which the following is a specification.

This invention relates to improvements in roller bearings, and it consists in certain peculiarities of the construction, novel arrangement, combination and operation of the various parts thereof, as will be hereinafter more fully set forth and specifically claimed.

The principal object of the invention is to provide a roller bearing, which shall be simple and inexpensive in construction, easily assembled, strong, durable, and efficient in operation, with its parts so made, arranged, and cooperating with one another, as to perform the functions of anti-friction rollers heretofore in general use, and in addition thereto, afford means whereby load carrying rollers only are used in connection with the retaining rings or means thereof.

Still another object of the invention is to provide means to take care of or carry side thrusts of the parts and to reduce to a minimum, noise incident to the operation of the various parts of the bearing. Still another object is to provide a bearing in which the rollers thereof will have uniform and simultaneous bodily, as well as individual, movements.

Other objects and advantages of the invention will be disclosed in the following description and explanation.

In the accompanying drawing, which serves to illustrate an embodiment of the invention—

Like numerals of reference refer to corresponding parts throughout the different views of the drawing.

Figure 1:
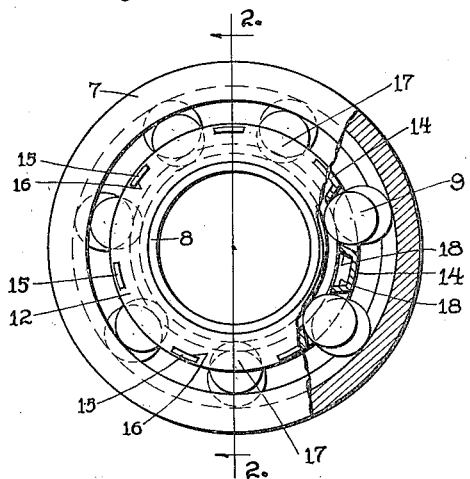
Fig. 1 is a face view partly in elevation and partly in section of a bearing, showing the parts thereof in their operative positions.

Referring to the drawing, the reference numeral 7 designates the outer retaining member or ring of the bearing, which may be made of any suitable size and material. This member is made of a single piece, and preferably in the form of a ring, but if desired, it may have its outer portion of other shape than circular. The inner surface of the periphery of the ring 7 is inclined from each of its edges towards the outer surface of the ring to a point about midway between the sides of the ring. The inner retaining member or ring of the bearing is indicated by the numeral 8, and is made of a single piece and of any suitable size, but by preference of the same width as the outer ring, and is normally concentrically located in said outer ring but spaced therefrom.

Figure 2:
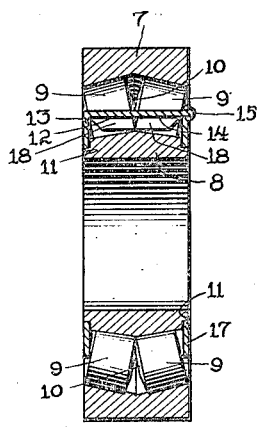
Fig. 2 is a central sectional view taken on line 2—2 of Fig. 1 looking in the direction indicated by the arrows.

The inner ring 8 which may be suitably mounted on a journal or axle, has it outer periphery inclined from each of the side edges thereof towards the outer ring, as is clearly shown in Fig. 2 of the drawing, in which view it will be seen that while the inclined portions leading from the edges of the outer ring and the corresponding portions of the inner ring are inclined in the same direction, yet it will be understood that the inclinations of said parts are not located in parallel planes, but are so disposed that the space between the co-inciding inclined portions of the inner and outer rings are wider near the inner or middle portions or apexes of said inclined walls, than at their outer ends.

By this arrangement an annular space having upwardly inclined and slightly contracted walls from its middle portion is provided, in which a plurality of anti-friction rollers 9 are located with that portion of their inner ends adjacent the inner member 8 in contact with one another and in a pair of rows as will be readily understood by reference to Fig. 2 of the drawing. Each of these rollers by preference has its inner end slightly beveled as at 10 for the purpose of permitting the members of each pair of rollers contacting with each other at their adjacent ends at points adjacent the inner retaining member.

Each of the rollers 9 is tapered from its inner portion or end to its outer end to correspond with the tapered space between the outer retaining ring and the inner retaining ring between which the rollers are located.

Figure 4:
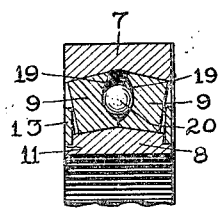
Fig. 4 is a fragmental sectional view of parts of the inner and outer retaining members or rings with a pair of the rollers interposed therebetween and illustrating a modification in the construction of the device.
Figure 5:
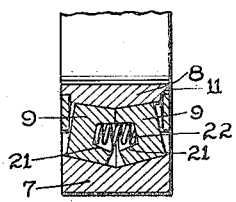
Fig. 5 is a similar view of like parts illustrating another modified construction.

As is clearly shown in Figs. 2, 4 and 5 the inner retaining ring 8 is provided at each of its edges and in its outer periphery with a circumferentially disposed angular recess 11 for the reception of members of the spacing element for the rollers. This spacing element is designated as a whole by the numeral 12 and consists of a flat ring 13 having extended from its inner surface at its outer periphery and at right angles to the ring a series of spaced arms or bars 14 each of which has at its free end a tongue 15 or reduced portion adapted to fit in openings 16 of another ring 17 which is located at its inner periphery in the groove or recess 11 of the inner retaining member opposite the recess 11 in which the ring 13 is located.

Each of the arms or bars 14 is provided at each of its edges with an inturned flange 18 between which the rollers 9 are located after the parts have been assembled. In Fig. 4 of the drawings I have illustrated a modification in the construction of the rollers of the device, the other parts thereof being of substantially the same construction and arrangement as above set forth. In this modification each of the rollers 9 is provided in its inner end with a depression 19 in which is located between the members of each pair of rollers, a ball 20 used for compensating for the wear incident to the contacting portions of the members of each pair of rollers. That is to say, that should the contacting portions of each pair of rollers become worn to a sufficient degree to decrease their efficiency, the balls 20 will act to support them in a similar manner as before they become worn.

In Fig. 5 I have illustrated still another modification in which the construction of the parts are the same as that shown in Figs. 1 to 3 inclusive and first above described except that each member of each pair of the rollers 9 is provided in its inner end with a nest or cavity 21, in which and between the members of each pair of rollers is located a spiral spring 22 which is employed to perform the same function as the balls 20 above described in connection with the modification shown in Fig. 4 of the drawing.

Figure 3:
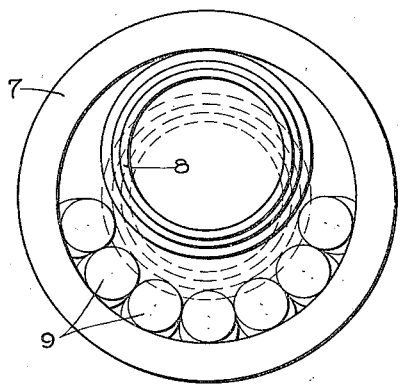
Fig. 3 is a side view of the bearing with the spacing elements for the rollers removed, showing by continuous lines the position of the parts in the first step of assembling the same and by dotted lines, the second or following step in said operation.

In order to assemble the parts of the bearing, the outer retaining member or ring 7 may be placed in about the position shown in Fig. 3 of the drawing, when a plurality of load carrying rollers 9 may be placed in a pair of rows on the inner surface of the said retaining member, and when the balls 20 or springs 22 are employed, with a ball 20 or a spring 22 between the inner ends of each pair of the rollers, in which position said balls and springs will be retained by reason of the depressions 19 and nests 21, in which said balls and springs are respectively located. The arrangement of the rollers in the first step of assembling the parts is shown by continuous lines in Fig. 3 of the drawing, in which view it will be seen and understood that the inner retaining ring 8 is then placed eccentrically within the outer retaining ring 7 as shown by continuous lines in said figure, when by causing the inner to assume the dotted line position, it is manifest that the rollers 9 can be moved between the inner and outer retaining members and properly spaced.

When the rollers are thus arranged, the ring 13 of the spacing element 12 which carries the arms 14 extended from the inner surface of said ring can be placed between the retaining rings 7 and 8 at one of their edges in such a manner that said ring will rest in one of the annular recesses 11 of the inner retaining member while the arms 14 with their flanges 18, will be interposed between the pairs of rollers as will be understood by reference to Fig. 1 of the drawing. When the spacing element has thus been located the detachable ring 17 having the openings 16 therein for the reception of the tongues 15 on the free ends of the arms 14 may be placed on the opposite side of the inner retaining member 8 within the recess 11 thereof, when it will be understood that the tongues 15 will enter said openings and may be riveted or otherwise fixed to the last named ring.

Having thus fully described my invention, what I claim as new and desire to secure by Letters Patent is—

1. In a roller bearing, the combination with a single piece inner bearing member having its outer periphery inclined outwardly from each of its edges, of a single piece outer bearing member having its inner periphery outwardly inclined from each of its edges, a plurality of oppositely tapered rollers located between said members in pairs with their larger ends facing and in contact with each other, and means to hold said pairs of rollers in spaced relation circumferentially with respect to the said bearing members, said spacing means embodying a ring seated on the inner bearing member at one of the peripheral edges thereof and having a plurality of arms extending at right angles therefrom across the periphery of the inner bearing member, each of said arms having on each of its sides an inwardly deflected flange and at its free end a tongue, and another ring seated on the opposite peripheral edge of the inner bearing member and having spaced openings to receive the tongues on said arms.

2. In a roller bearing, the combination with an inner bearing member having its outer periphery inclined outwardly from each of its edges, of an outer bearing member having its inner periphery outwardly inclined from each of its edges, a plurality of oppositely tapered rollers located between said members in pairs with their larger ends facing and in contact with each other, and means to hold said pairs of rollers in spaced relation circumferentially with respect to the said bearing members, said spacing means embodying a ring seated on the inner bearing member at one of the peripheral edges thereof and having a plurality of arms extended at right angles therefrom across the periphery of the inner bearing member, each of said arms having at its free end a tongue and another ring seated on the opposite peripheral edge of the inner bearing member and having spaced openings to receive the tongues on said arms.

3. In a roller bearing, the combination with an inner bearing member having its outer periphery inclined outwardly from each of its edges, of an outer bearing member having its inner periphery outwardly inclined from each of its edges, a plurality of oppositely tapered rollers located between said members in pairs with their larger ends facing and in contact with each other, and means to hold said pairs of rollers in spaced relation circumferentially with respect to the said bearing members, said spacing members embodying a ring seated on the inner bearing member at one of the peripheral edges thereof and having a plurality of arms each having parallel edges and extended at right angles therefrom across the periphery of the inner bearing member, and another ring seated on the opposite peripheral edge of the inner bearing member and secured to the adjacent ends of said arms.

JOHN B. BIRGH.